(12) United States Patent
O'Keeffe et al.

(10) Patent No.: US 6,798,397 B2
(45) Date of Patent: Sep. 28, 2004

(54) MOUSE WITH CANTILEVERED ROLLER

(75) Inventors: Denis O'Keeffe, Newmarket (IE); Ying Chieh Hung, Hsinchu (TW); Neil O'Connell, Cork City (IE)

(73) Assignee: Logitech Europe S.A. (CH)

( * ) Notice: Subject to any disclaimer, the term of this patent is extended or adjusted under 35 U.S.C. 154(b) by 0 days.

(21) Appl. No.: 09/978,173

(22) Filed: Oct. 15, 2001

(65) Prior Publication Data

US 2003/0071788 A1 Apr. 17, 2003

(51) Int. Cl.[7] ................................................. G09G 5/08
(52) U.S. Cl. ........................ 345/163; 345/167; 345/184
(58) Field of Search ................................ 345/163, 164, 345/167, 184

(56) References Cited

U.S. PATENT DOCUMENTS

| | | | | |
|---|---|---|---|---|
| 6,099,929 A | * | 8/2000 | Chinen | 428/40.1 |
| 6,256,011 B1 | * | 7/2001 | Culver | 345/157 |
| 6,285,355 B1 | * | 9/2001 | Chang | 345/163 |
| 6,344,643 B1 | * | 2/2002 | Chen | 250/221 |
| 6,400,356 B1 | * | 6/2002 | Bidiville et al. | 345/163 |
| 2001/0017614 A1 | * | 8/2001 | Hara et al. | 345/163 |
| 2002/0118174 A1 | * | 8/2002 | Rodgers | 345/163 |
| 2003/0006965 A1 | * | 1/2003 | Bohn | 345/163 |

* cited by examiner

Primary Examiner—Kent Chang
Assistant Examiner—Tom Sheng
(74) Attorney, Agent, or Firm—Townsend and Townsend and Crew LLP

(57) ABSTRACT

A roller for an input device extends through a slot in a top housing and is supported by a cantilevered arm. The roller is attached at the end of the arm and rotates about a shaft mounted on the cantilevered arm. The cantilevered arm is attached proximate the rear of the top housing, and thus is free to flex when the roller is depressed. As a result, when pressure is applied to the roller, the roller depresses through the slot in the top housing independently from the buttons on the top housing. The cantilevered arm has a spring force to bias the roller upward, eliminating the need for a return spring (lift spring).

21 Claims, 11 Drawing Sheets

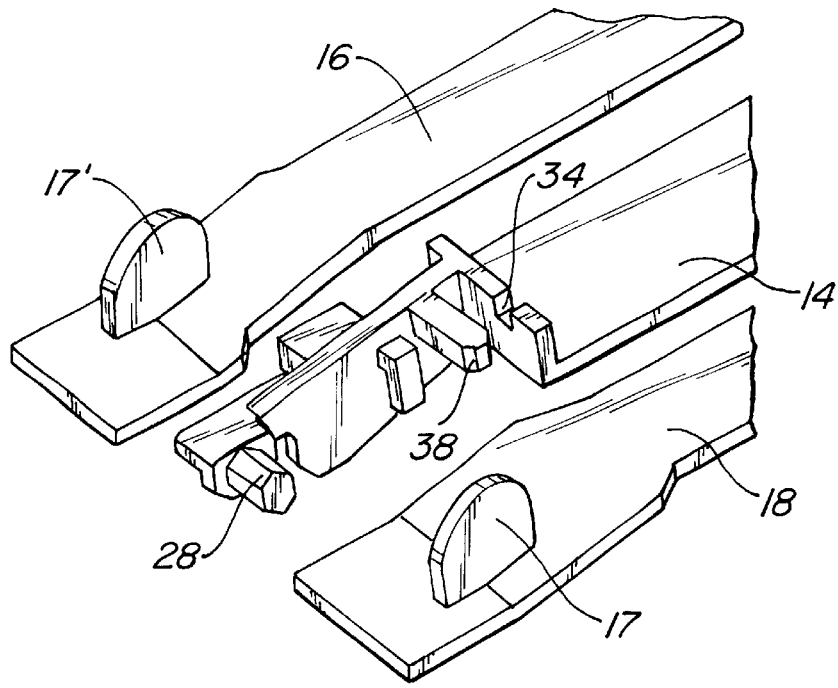
FIG. 5(a)
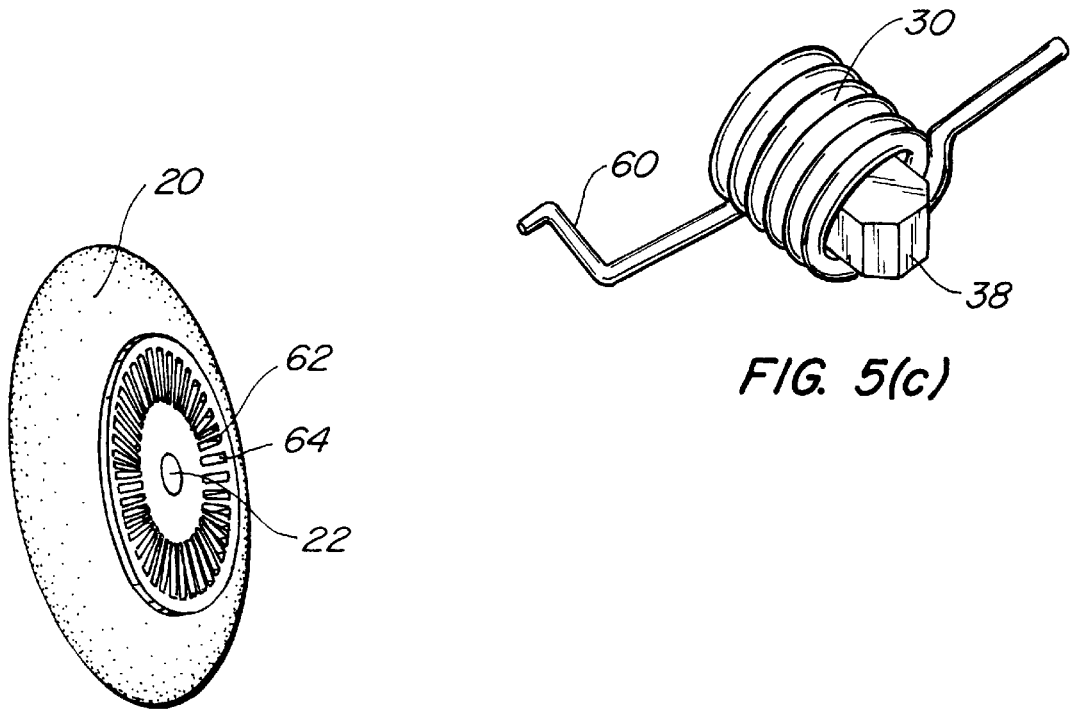
FIG. 5(c)
FIG. 5(b)

MOUSE WITH CANTILEVERED ROLLER

BACKGROUND OF THE INVENTION

The present invention relates to computer mice or track balls, and in particular to those including a roller.

In one type of computer mouse, a ball protrudes from the bottom of the mouse housing, and rolls across a supporting surface. The movement of the ball is typically detected by shafts which are in contact with the ball and turn an encoder wheel having a number of slots. Track balls will have a ball mounted on the top with the housing being stationary, but similarly operate with two encoder wheels at 90° angles to detect X and Y movement. Optical mice and trackballs have also been developed.

Such mice and track balls typically also have buttons which can be depressed or clicked by a user, and which depress a switch (microswitch, pancake, optical, etc.). These provide additional inputs to the computer, in addition to the position of the mouse or trackball. Some mouse designs have added a roller or wheel which can be used for such functions as scrolling or zooming. The roller is operated by a user finger much like a dial on a radio.

One roller design is shown in U.S. Pat. No. 5,298,919 assigned to Multipoint Technology Corporation. This has a user operable roller which has a shaft extending out from it, and an encoder wheel attached to the shaft. The encoder wheel is like the optical encoders used on the mice or trackball balls. Microsoft U.S. Pat. No. 5,473,344 shows a design similar to the Multipoint one in which a shaft from the roller is connected to a separate optical encoder wheel. One Microsoft product has a shaft supporting the roller and encoder wheel, with the shaft being itself mounted on forks extending up from the lower housing of the mouse through openings in a circuit board.

Another design is shown in U.S. Pat. No. 5,313,230 assigned to Apple Computer. This shows two finger rollers with a shaft which drives a belt which is connected to a pulley on a separate encoder. A similar pulley system is shown in U.S. Pat. No. 5,530,455 assigned to Mouse Systems.

Yet another design is shown in U.S. Pat. No. 5,446,481 assigned to Mouse Systems. In this design, the roller has a shaft attached to a gear outside the roller, which drives an optical encoder wheel with the gear.

In addition to the rollers being turnable, a number of designs allow the roller itself to actuate a switch. In Microsoft U.S. Pat. No. 5,473,344, this is done with a roller which pivots inward under pressure from the finger, in addition to rolling about its axis. When pivoted inward, it will depress a microswitch to send an activation signal to the computer. Mouse Systems U.S. Pat. No. 5,530,455 shows a design in which the entire housing for the roller is depressed against supporting springs, and when depressed actuates an underlying microswitch. These designs typically use a lift spring to bias the roller upward returning it to the initial position.

U.S. Pat. No. 5,095,303 to Apple Computer shows a graphic controller with three dials, with at least one of the dials shown with an encoder ring and detectors, with the detectors being shown on either side of the dial in one drawing. However, unlike some of the designs discussed above, the dials are on a fixed axis and cannot be depressed to actuate a microswitch and provide another input signal.

A roller design having slots in the roller wheel itself is shown in Primax Electronics' U.S. Pat. No. 5,808,568. That patent also shows a support for the wheel which pivots with the wheel to depress a switch.

A roller design where the roller is attached to the top housing is shown in applicant's copending U.S. patent application Ser. No. 09/408,089, filed Sep. 29, 1999. However, unlike some of the designs discussed above the roller is fixed with respect to the button so that when the roller is depressed, the button depresses to cause a switch activation. In this design a wire spring has one end attached to the inside of the button, and the other end contacting an undulating surface on the inside of the roller. This provides a ratchet feel when a user rotates the roller, while the roller is supported by a simple pair of pegs on supports on the underside of the button. The pegs snap into cylindrical holes in the center of the roller around which the roller rotates.

Yet another design of the invention of the pending U.S. patent application Ser. No. 09/408,089 shows that the button is made of a single piece of plastic with the body of the housing. The design provides a simple U-shaped loop which is simple to mold. The ability to depress the button is given by the hinge effect of the loop, with the amount and angle of button depression being controlled by a thinner portion of the loop. The loop can be sufficiently long to provide the appropriate hinge arm for the depression.

BRIEF SUMMARY OF THE INVENTION

The present invention provides a roller for an input device. The roller extends through a slot of the top housing of the mouse and is attached on the end of a cantilevered arm. The cantilevered arm is attached to the inside surface of the top housing. The arm thus is free to flex when the roller is depressed. The arm also has a spring force to bias the roller upward, eliminating the need for a return spring present in a typical prior art device. As a result, when pressure is applied to the roller, the roller depresses through the slot independently from the buttons on the top housing and upon releasing the pressure the roller is biased upward by the spring force of the arm.

In one embodiment of the present invention a metal exterior housing functioning as a button is mounted over the top housing. When the metal housing is depressed, it presses down on an actuator pip extending through the top housing, causing the arm to depress a microswitch mounted on a circuit board beneath the arm.

In one embodiment of the present invention the roller is mounted on a cantilevered arm that has a single attachment point proximate the rear of the top housing. The arm also has a shaft molded as part of the arm, so that the roller rotates about the shaft.

For a further understanding of the nature and advantages of the invention, reference should be made to the following description taken in conjunction with the accompanying drawings.

BRIEF DESCRIPTION OF THE DRAWINGS

FIG. 5 is an exploded view of the cantilevered arm and shaft with the roller and ratchet spring removed.

DETAILED DESCRIPTION OF THE INVENTION

Figure 1:
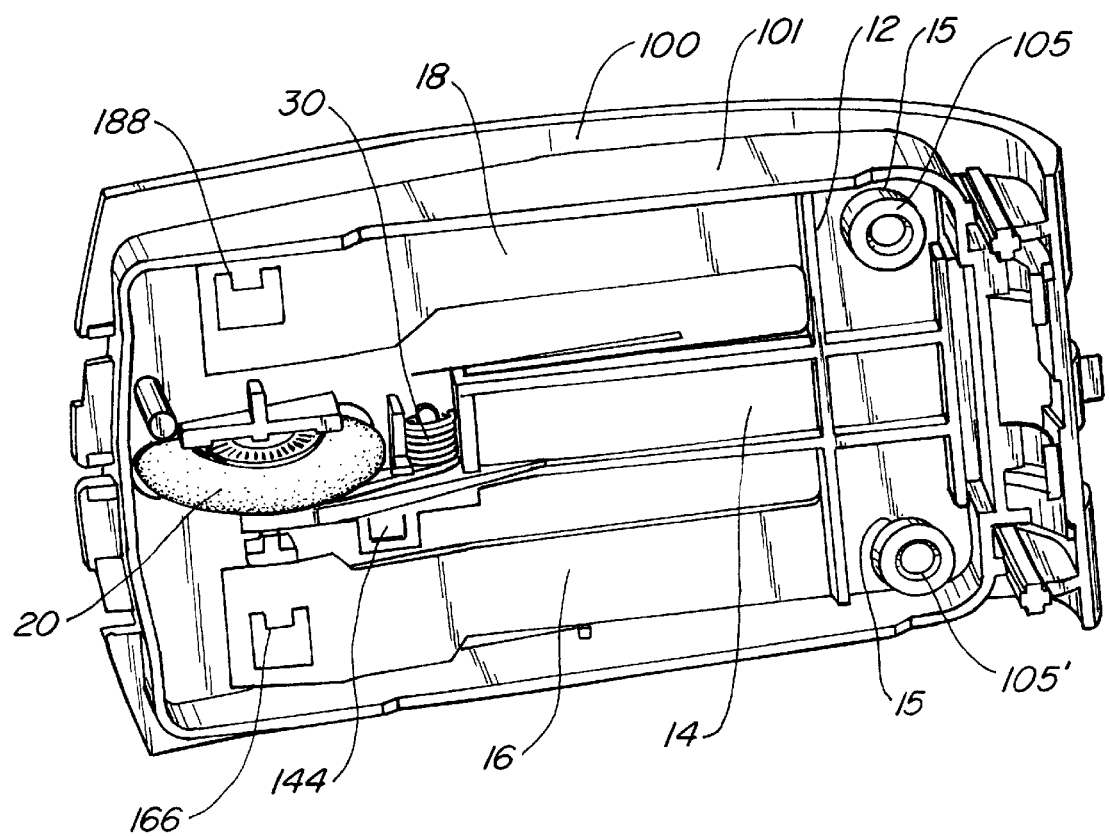
FIG. 1 is a perspective view of the underside of the exterior housing, top interior housing, cantilevered arm and roller of one embodiment of the invention.

FIG. 1 is a perspective view of the underside of an exterior housing 100 and a top interior housing 101 with an internal keyplate 12 mounted on the top interior housing according to one embodiment of the invention. The exterior housing 100 is preferably made of metal, and acts as two buttons in addition to functioning as the exterior housing. The top interior housing 101 has two pegs 105, 105' proximate the rear of the top housing. The pegs snap fit into the keyplate to attach the keyplate to the interior housing by engaging two sockets 15 in internal keyplate 12. The pegs are loosely located in the keyplate to avoid the metal popping out in a drop test. The loose location has a benefit of providing the drop test assistance and not requiring precise tolerances. The internal keyplate 12 is formed of three cantilevered arms 14, 16, and 18. The ends of the side arms 16 and 18 serve as side buttons 166 and 188 (left and right click buttons) when depressed by a user finger on the corresponding button portion of exterior housing 100. The cantilevered arms 14, 16, and 18 are formed of an integral piece of plastic and are connected proximate the rear of the keyplate 12 and the top housing 100.

Middle cantilevered arm 14 supports a roller 20 attached on the end of the arm 14, proximate the front of the plate 12 and the top housing. The middle arm 14 has a protrusion 144 that serves to activate an underlying microswitch when the roller is depressed. The arm 14 has a spring force to bias the roller upward, eliminating the need for a return spring, in contrast with a typical prior art mouse that has a complex support structure for a roller mounted on the bottom housing and that needs a lift spring to bias the roller upward.

Figure 2:
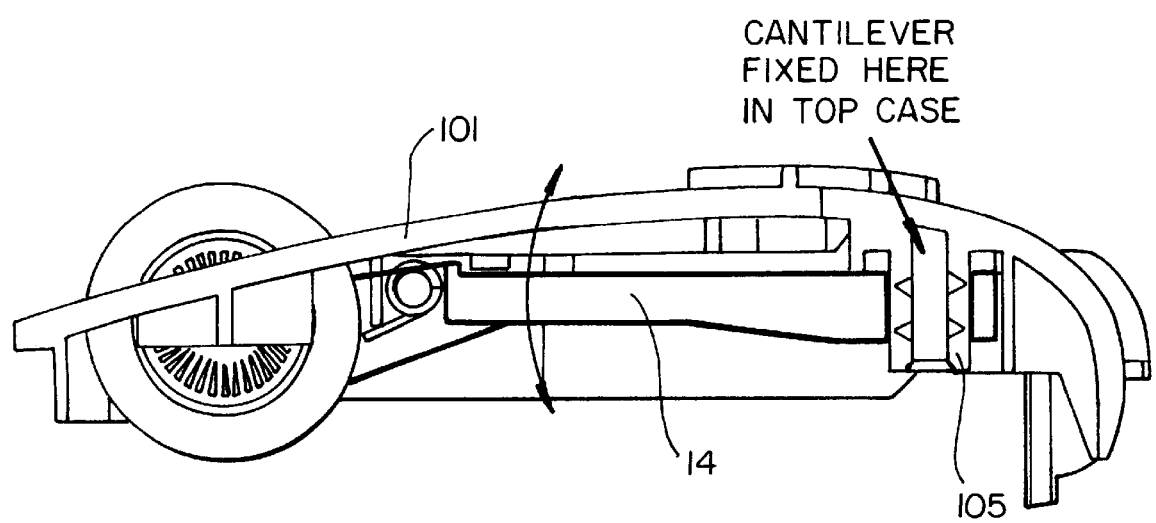
FIG. 2 is a cross-sectional view of the top housing with the cantilevered arm attached to the top housing of the embodiment of FIG. 1.

FIG. 2 is a cross-sectional view of the top housing that further illustrates how a cantilevered arm 14 is attached to the interior top housing 101. The exterior top housing 100 is mounted over the top interior housing 101 to which the keyplate 12 is attached with pegs 105 and 105'.

Figure 3:
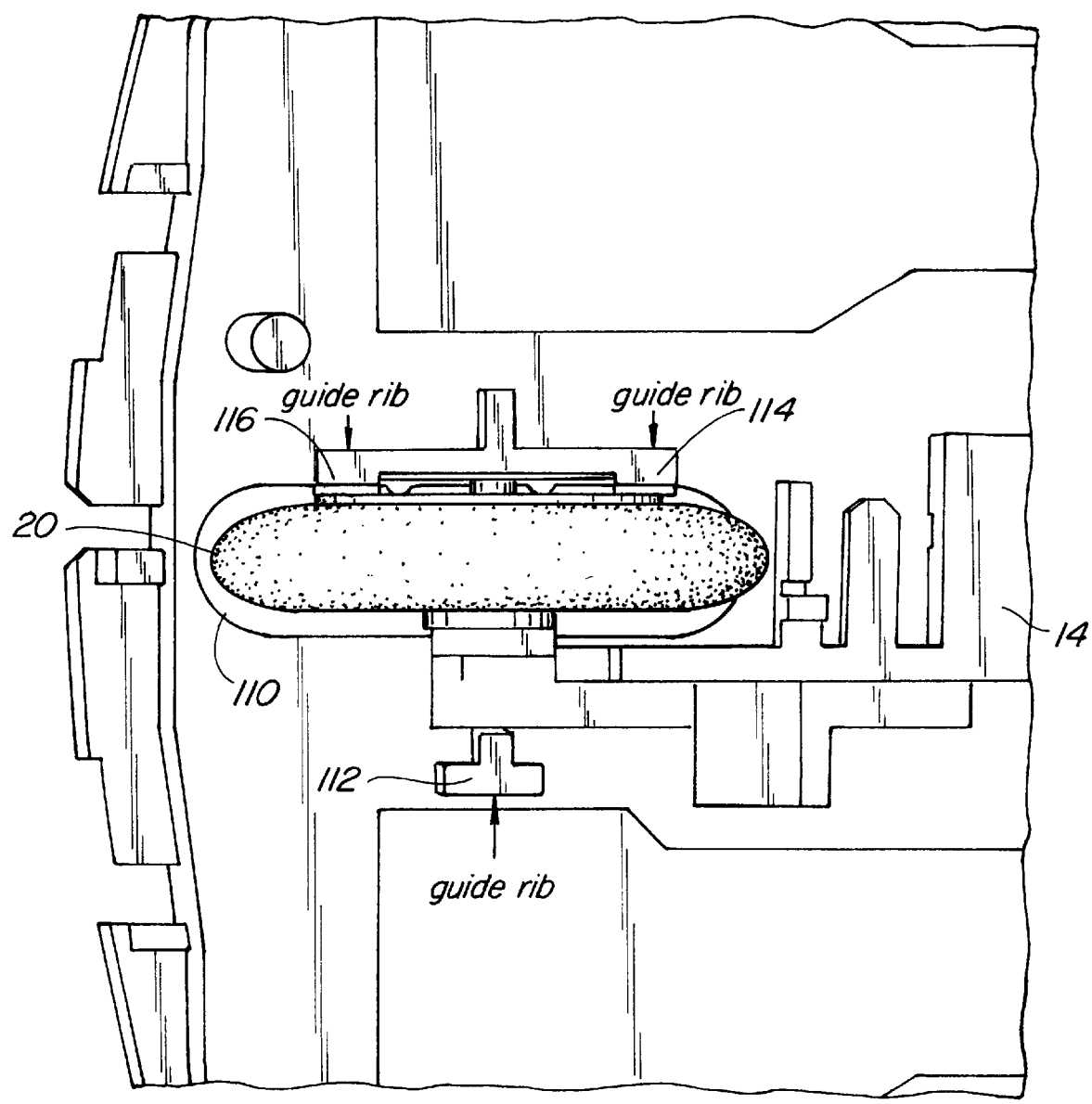
FIG. 3 is a view of the inside surface of the top case with the guide ribs for alignment of the roller, and with the roller extending through a slot in the top housing.

FIG. 3 shows a slot 110 in the top housing. As is clear from a cross-section view of the top housing shown in FIG. 2, the cantilevered arm is attached to the top housing proximate the rear of the top housing. The roller 20 is attached at the end of the arm 14 and rotates about the shaft 28 (not shown here). The roller extends through the slot 110 shown in FIG. 3. In prior copending application Ser. No. 09/408,089 the roller is attached to the button on the top housing, and is depressed together with the middle button on the top housing. In contrast, in the present invention the roller is mounted on the cantilevered arm that has a single attachment point proximate the rear of the top housing, and thus is free to flex when the roller is depressed. As a result, when the pressure is applied to the roller, the roller depresses through the slot 110 independently from the buttons on the top housing.

FIG. 3 also shows the inside surface of the top case, illustrating the roller alignment made with the guide ribs 112,114 and 116. The guide ribs prevent sideways movement of the roller and arm 14 without impeding its rotation. Referring back to FIG. 1, a ratchet spring 30 also stabilizes the roller in addition to providing a user with a ratchet feel.

Figure 4:
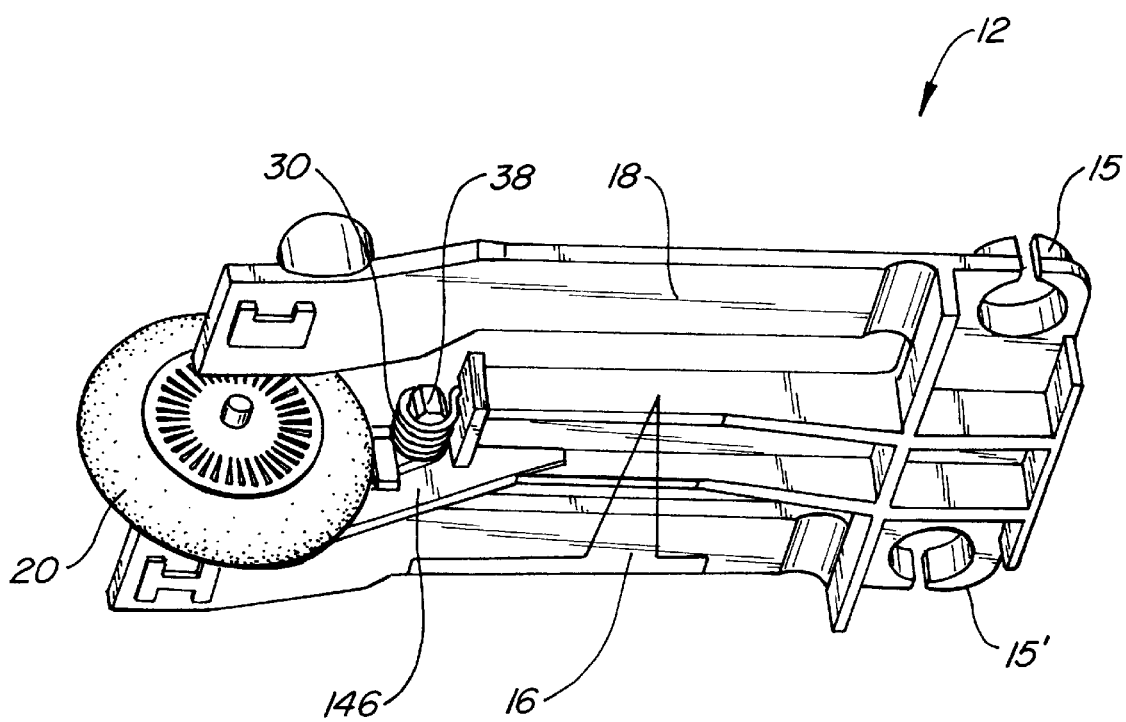
FIG. 4 is a perspective view of an embodiment of the cantilevered arm with the roller and a ratchet spring.

FIG. 4 shows the internal keyplate 12 of FIG. 1 without the top housing attached. Keyplate 12 has cantilevered arms 14, 16 and 18, with the roller 20 attached to the middle cantilevered arm 14. A ratchet spring 30 wound around a member 38 extends from the cantilevered arm. A portion 146 of the arm 14 proximate to the roller 20 extends at a downward angle to both (1) follow the shape of the top housing 100 and (2) improve the spring effect of the cantilevered arm. This portion both stiffens the cantilever beam to improve the spring force and provides control for the ratchet spring. Alternately, the plastic cantilever can be stiffened by the addition of stiffening ribs to tune and control the return spring force of the system. The keyplate 12 also has two sockets 15 and 15'. The pegs 105 and 105' of the interior housing of FIG. 1 snap fit into the sockets 15, 15' of the keyplate 12 attaching the keyplate to the top interior housing.

FIGS. 5(a)–5(c) are an exploded view illustrating the front portion of the cantilevered arm 14 with a roller shaft 28 and a square member 38, serving as a post for a ratchet spring 30. FIG. 5(a) also shows the front parts of the arms 16 and 18 with actuator pips 17 and 17'. FIG. 5(b) shows a disassembled roller 20. FIG. 5(c) shows a disassembled ratchet spring 30. Roller 20 has a central hub 22 with a cylindrical hollowed center on the opposite side of the roller for engaging shaft 28. The flat side of the roller 20 can be seen in FIG. 5(b) showing the hub 22 connected to the outside of the roller by a series of spoke-like members 62 which define in between them slots 64. As the roller is rotated by the user, the slots alternately allow light to pass between being blocked by spokes 62. The recessed interior with the slots forming an undulating inside surface allows an end 60 of spring 30 to engage the undulating inside surface providing user with a ratchet feel that in turn allows the user to control rotation of the roller in the discrete increments of a full revolution.

Figure 6:
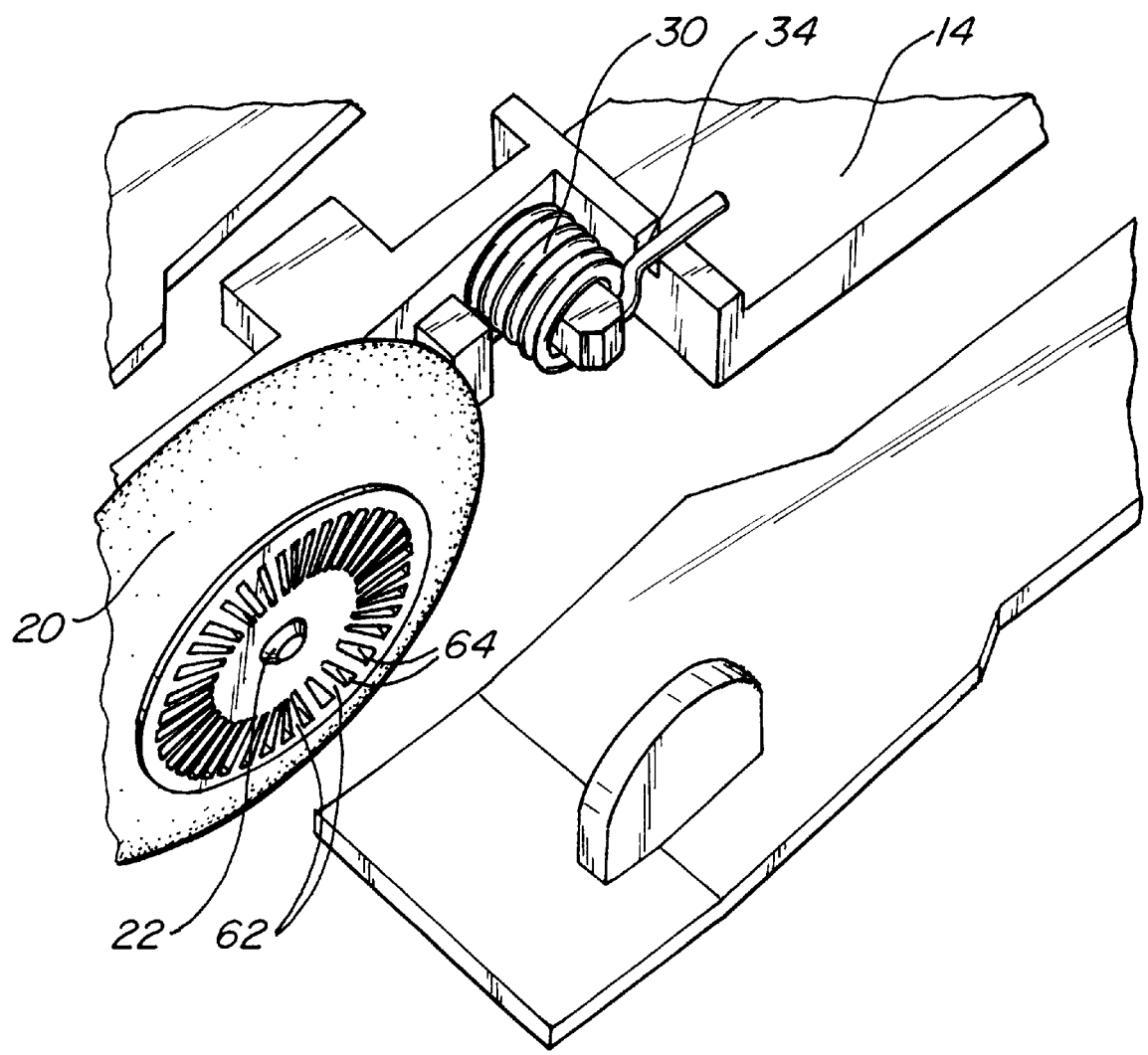
FIG. 6 is an enlarged view of the front portion of the cantilevered arm of the embodiment of FIG. 1.

FIG. 6 shows enlarged view of the front portion of the cantilevered arm 14 and a ratchet spring 30. The ratchet spring 30 is wound around a square post 38, extending from the front part of the cantilevered arm. The spring 30 is anchored by a support groove 34 on the upper surface of the middle arm 14. The other end 60 of spring 30 contacts an inside, undulating surface of roller 20. The undulating surface can be formed as shown in prior Logitech application Ser. No. 08/949,681, filed Oct. 14, 1997, entitled "Optical-Mechanical Roller with Ratchet."

Figure 7:
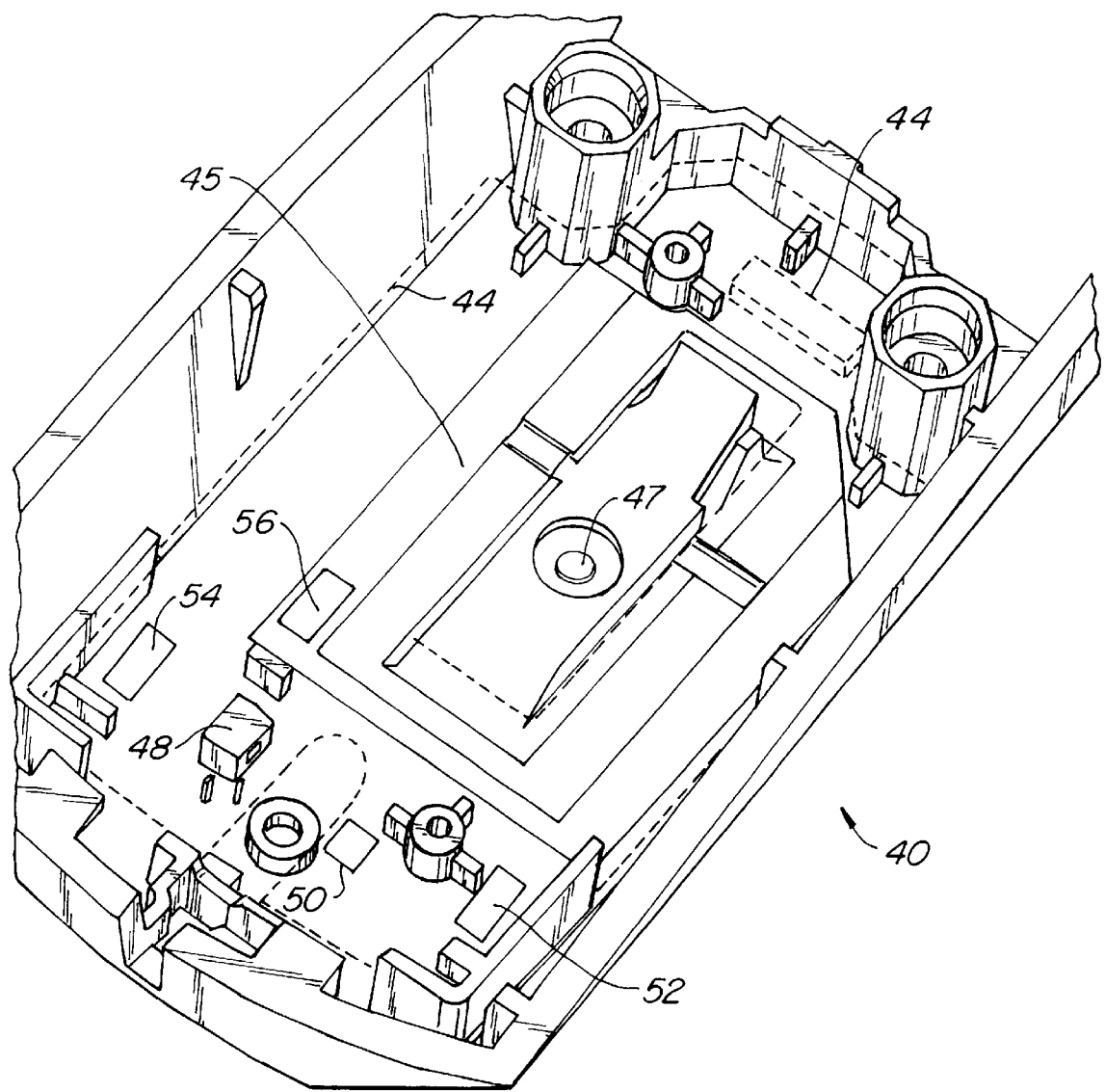
FIG. 7 is a perspective view of the bottom case with a circuit board.

FIG. 7 illustrates the layout of a printed circuit board (PCB) 44, outlined in phantom, and mounted on a lower housing 40 of the mouse. On the printed circuit board is mounted a light emitter, such as a light emitting diode (LED) 48. LED 48 is on one side of the roller, while on the other side, opposite LED 48, is a photo detector 50. As the roller is rotated, the slots 64 alternately block and let light pass from emitter 48 to detector 50. These slots in the roller can be seen in the view of FIG. 5.

FIG. 7 also shows microswitches 52 and 54 which are placed beneath the two side buttons 166 and 188 at the end of each of the cantilevered arms 16 and 18 of FIG. 1. In addition, a third switch 56 is provided to be activated by a protrusion 144 on the cantilevered arm 14, that serves as a third button when the roller is depressed, visible in FIG. 1. The microswitches 52, 54 and 56 as well as an optical module 47 are mounted on the circuit board 44.

Figure 8:
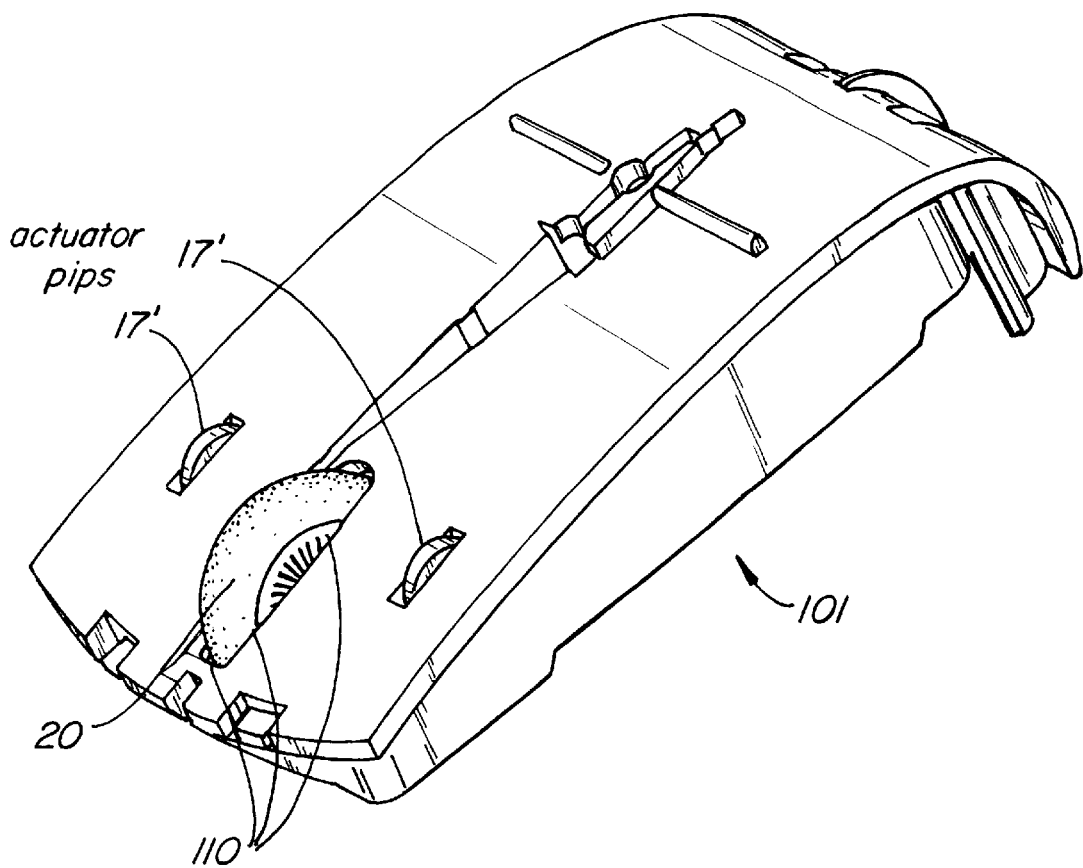
FIG. 8 is an exterior view of the top interior housing.

FIG. 8 illustrates the exterior appearance of the top interior housing 101. Roller 20 extends through the slot 110 of the top interior housing. A tab (actuator pip) 17, 17' on an interior cantilevered arm for each button also extends through the slot of the top interior housing 101. When a metal housing mounted over the interior top housing is depressed, it presses down on a actuator pips 17 and 17' and causes the arm to depress a microswitch mounted on a circuit board beneath the arm.

Figure 9:
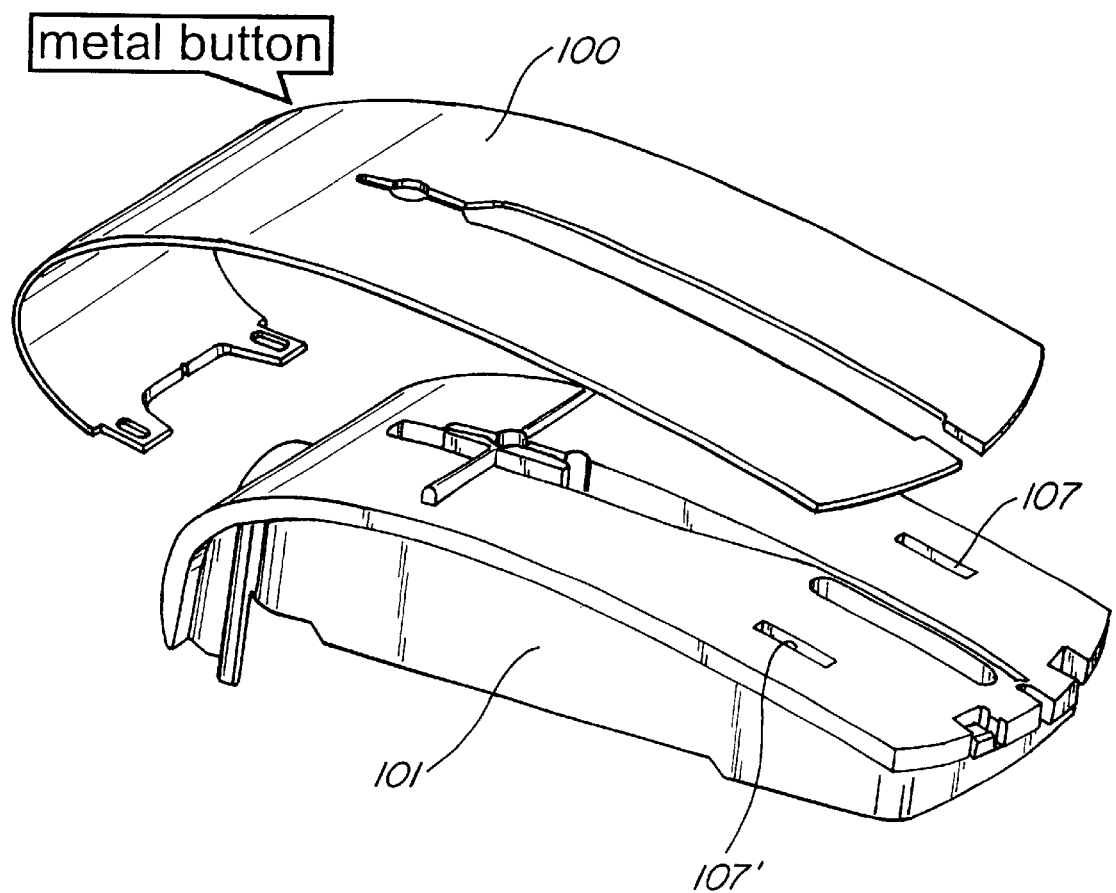
FIG. 9 is an exploded view of the top interior housing and the metallic exterior housing functioning as a button.

FIG. 9 shows an exploded view of the top interior housing 101 and the metallic exterior housing 100. FIG. 9 also shows the slots 107 and 107' in the top interior housing 101, through which the actuator pips 17, 17' extend as shown in FIG. 8. When the metal housing 100 is depressed, it presses down on a actuator pips extending through the slots 107 and 107' in the top housing 101, and causing the arm to depress a microswitch mounted on a circuit board beneath the arm.

Figure 10:
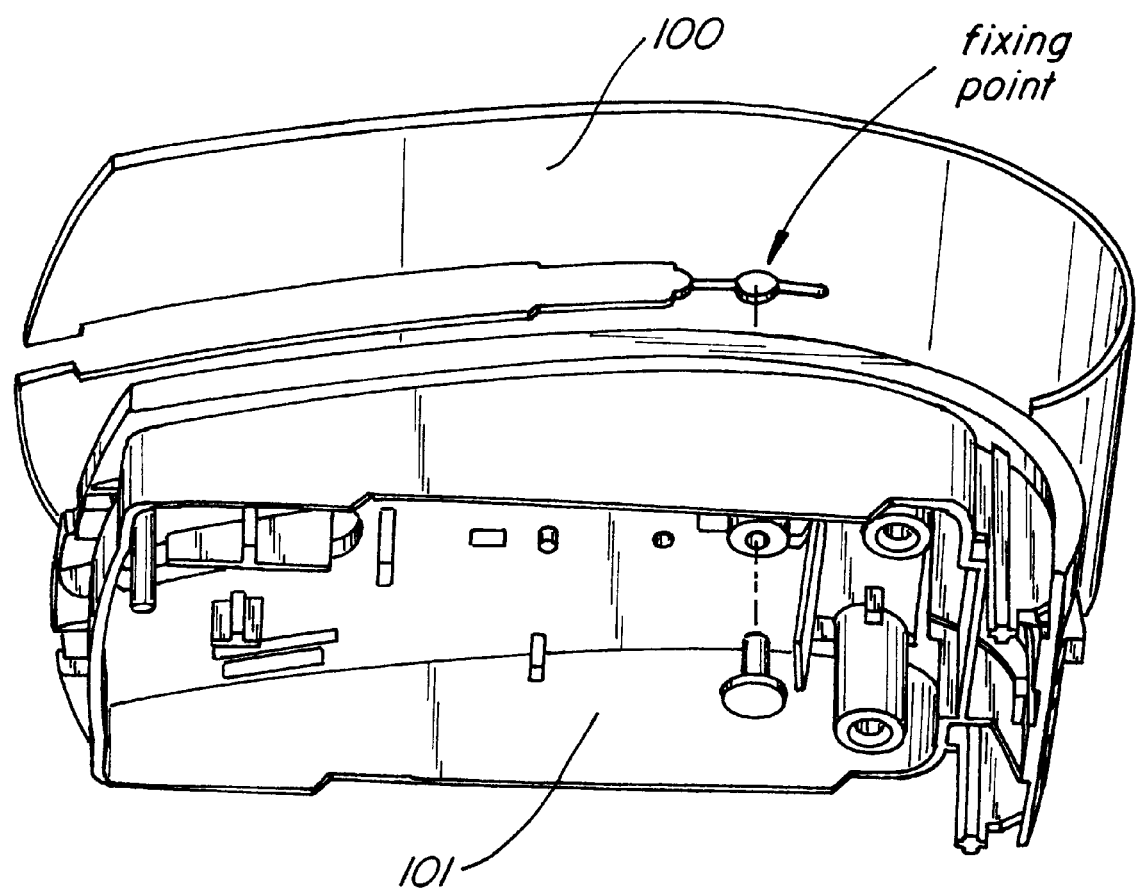
FIG. 10 is an exploded view of the top interior housing and the metallic exterior housing with a single fixing point for attaching the exterior housing to the top interior housing.

FIG. 10 shows one embodiment of the present invention with a metal exterior housing 100 functioning as a button mounted over the top interior housing 101. The button 100 is attached to the interior housing 101 at one fixing point only. In addition, the back of the metal housing wraps around and press-fits against the back of the mouse. This provides a pivot point for the depression of the metal housing as a button. This both allows the button to be depressed in front of the pivot point, and allows the metal to flex behind the pivot to provide impact distribution for a drop test.

Figure 11:
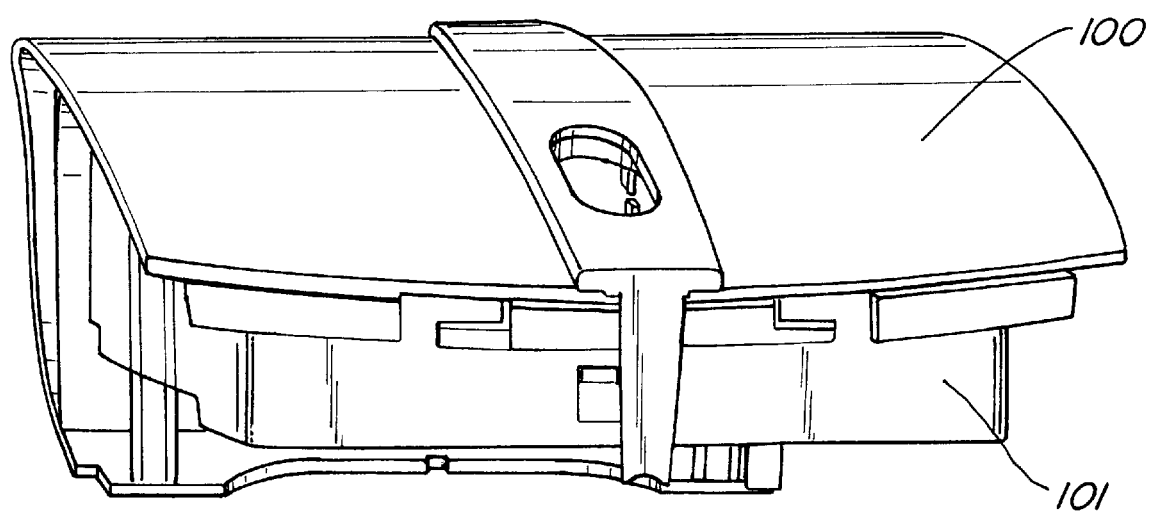
FIG. 11 is an exterior view of the metallic top housing with the roller removed.

FIG. 11 shows the exterior view of the metallic top housing 100 with the roller removed. The actuator pips shown in FIG. 8 are hidden by the exterior top housing 100.

As will be apparent to those skilled in the art, the present invention may be embodied in other specific forms without departing from the essential characteristics thereof. For example, the keyplate could have two arms instead of three. The arms could be attached to the housing at multiple spots instead of at a single spot. The exterior top housing functioning as a button could be plastic. Also the exterior top housing could have one or three buttons instead of two. Accordingly, the foregoing description is intended to be illustrative, but not limiting, of the scope of the invention which is set forth in the following claims.

What is claimed is:

1. An input device comprising:
   a top housing with a slot;
   a roller extending through said slot;
   a cantilevered arm supporting the roller, wherein the cantilevered arm is attached to an inside surface of the housing behind the roller; and
   an exterior housing mounted over said top housing, and including at least one cantilever portion adjacent to the roller and extending over a portion of the top housing adjacent to the slot, wherein the cantilever portion forms a portion of a button configured to be pressed by a user.

2. The input device of claim 1, wherein the cantilevered arm extends at a downward angle proximate to the roller.

3. The input device of claim 1, wherein the exterior housing is metallic.

4. The input device of claim 1, wherein the cantilevered arm is plastic.

5. The input device of claim 1, wherein the cantilevered arm is integrally formed with two other cantilevered arms, and wherein
   the two other centilevered arms each forms a part of corresponding button mechanisms and are disposed adjacent opposite sides of the roller below the top housing, configured to be pressed by the cantilevered portion if the cantilevered portion is pressed by a user.

6. The input device of claim 1, wherein the cantilevered includes a portion positioned over a microswitch to depress the microswitch.

7. The input device of claim 1, wherein the cantilevered arm provides a spring force to bias the roller upward through the slot.

8. The input device of claim 1, wherein said input device is a mouse.

9. The input device of claim 1 further comprising:
   a roller shaft, attached to said cantilevered arm to support said roller, said roller shall being only partially circular in cross-section.

10. The device of claim 1 further comprising:
    a ratcheting mechanism connected to said roller for resisting movement of said roller to provide a ratcheting feel to a user.

11. The device of claim 10 wherein said ratcheting mechanism comprises:
    an undulating surface on an inside of said roller; and
    a spring having a first end wound around a member extending from the arm, and a second end biased against said undulating surface.

12. The device of claim 1 further comprising:
    a circuit board mounted inside said housing beneath said roller;
    a light emitter mounted on said circuit board on a first side of said roller;
    a light detector mounted on said circuit board on a second side of said roller; and
    said roller having a plurality of slots for allowing light from said light emitter to pass through to said light detector.

13. The input device of claim 1, wherein the cantilever portion is configured to provide a return force if pressed by a user.

14. A mouse comprising:
    a top housing with a slot;
    a roller extending through said slot;
    a cantilevered arm supporting the roller and attached to an inside surface of the top housing behind the roller, wherein the cantilevered arm provides a spring force to bias the roller upward through the slot eliminating the need for a return spring; and
    an exterior housing mounted over said top housing, and including at least one cantilever portion adjacent to the roller and extending over a portion of the top housing adjacent to the slot, wherein the cantilever portion forms a portion of a button configured to be pressed by a user.

15. The input device of claim 14, wherein the cantilevered arm is plastic.

16. The input device of claim 14, wherein the cantilevered arm is attached to said input device proximate the rear of the input device opposite said roller.

17. The input device of claim 14, wherein the exterior housing is metallic.

18. The input device of claim 14, wherein the cantilever portion is configured to provide a return force if pressed by a user.

19. A mouse comprising:

a top housing with a slot;

a roller extending through said slot;

a plastic cantilevered arm supporting the roller and attached to an inside surface of the top housing behind the roller, wherein the cantilevered arm provides a spring force to bias the roller upward through the slot eliminating the need for a return spring, and wherein the said top housing supports an exterior housing mounted over said top housing, and including at least one button cantilever portion adjacent to the roller and extending over a portion of the top housing adjacent to the slot, wherein the portion forms a portion of a button configured to be pressed by a user.

20. The input device of claim 19, wherein the cantilever portions is configured to provide a return force if pressed by a user.

21. An input device comprising:

a top housing with a slot;

a roller extending through said slot;

a cantilevered inn supporting the roller, wherein the cantilevered arm is attached to an inside surface of the housing behind the roller; and wherein the cantilevered arm is integrally formed with two other cantilevered arms that are disposed on opposite sides the cantilever arm, and the two other cantilevered arms each forms a part of corresponding button mechanisms and includes a portion that is depressible by a user to activate corresponding switches.

* * * * *